(12) United States Patent
Bernstein (10) Patent No.: US 12,153,559 B2
(45) Date of Patent: *Nov. 26, 2024

(54) SCALABLE FINE GRAINED ACCESS CONTROL WITHIN A SEARCH ENGINE

(71) Applicant: Hyland UK Operations Limited, Maidenhead (GB)

(72) Inventor: Joel Bernstein, New York, NY (US)

(73) Assignee: Hyland UK Operations Limited (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/229,917

(22) Filed: Aug. 3, 2023

(65) Prior Publication Data

US 2023/0409551 A1 Dec. 21, 2023

Related U.S. Application Data

(63) Continuation of application No. 16/748,649, filed on Jan. 21, 2020, now Pat. No. 11,762,829, which is a continuation of application No. 15/419,748, filed on Jan. 30, 2017, now Pat. No. 10,540,338.

(51) Int. Cl.
| | |
|---|---|
| *G06F 16/22* | (2019.01) |
| *G06F 16/21* | (2019.01) |
| *G06F 16/951* | (2019.01) |

(52) U.S. Cl.
CPC .......... *G06F 16/2272* (2019.01); *G06F 16/21* (2019.01); *G06F 16/951* (2019.01)

(58) Field of Classification Search
CPC ..... G06F 16/2272; G06F 16/21; G06F 16/951

USPC ........................................................ 707/756
See application file for complete search history.

(56) References Cited

U.S. PATENT DOCUMENTS

| | | | |
|---|---|---|---|
| 5,864,843 A | 1/1999 | Carino, Jr. et al. | |
| 8,918,388 B1* | 12/2014 | Chen | G06F 16/283 707/715 |
| 10,540,338 B2* | 1/2020 | Bernstein | G06F 16/2272 |
| 2009/0178144 A1* | 7/2009 | Redlich | G06F 21/6209 726/27 |
| 2010/0250497 A1* | 9/2010 | Redlich | G06Q 10/06 707/661 |
| 2011/0106853 A1* | 5/2011 | Baker | G06F 21/6218 707/E17.005 |
| 2011/0246439 A1 | 10/2011 | Isard et al. | |
| 2011/0302194 A1* | 12/2011 | Gonzalez | G06F 16/29 707/769 |

(Continued)

*Primary Examiner* — Hosain T Alam
*Assistant Examiner* — Nicholas E Allen
(74) *Attorney, Agent, or Firm* — Eschweiler & Potashnik, LLC (57) ABSTRACT

A system and method for providing fine-grained access control in a search engine. Access control predicates associated with a search query, including fixed-width and/or variable-width tokens, are received from the search engine, and are formatted in a machine-readable binary format to generate a single byte array. A pre-sorted memory index structure associated with the single byte array is generated, by sorting the access control predicates according to their token width. The pre-sorted memory index structure is merge joined with an uninverted terms index that includes a sorted list of all terms in a field associated with the search query, and a document index mapping the document identifier (ID) to a term ordinal for a specific field.

20 Claims, 7 Drawing Sheets

(56) References Cited

U.S. PATENT DOCUMENTS

| | | |
|---|---|---|
| 2012/0089339 A1* | 4/2012 | Ganeshalingam ...... G06F 16/22 |
| | | 702/19 |
| 2013/0097430 A1 | 4/2013 | Mittelstadt et al. |
| 2013/0339311 A1 | 12/2013 | Ferrari et al. |
| 2014/0280159 A1 | 9/2014 | Cao et al. |
| 2014/0344345 A1* | 11/2014 | Venkatraman ........ G06F 16/957 |
| | | 709/203 |
| 2015/0082399 A1* | 3/2015 | Wu .................... H04L 63/0838 |
| | | 726/10 |
| 2015/0193636 A1* | 7/2015 | Snelling .............. G06F 21/6218 |
| | | 726/28 |
| 2016/0104002 A1* | 4/2016 | Schneider ........... G06F 16/1865 |
| | | 726/4 |
| 2016/0125015 A1* | 5/2016 | Zwilling ................. G06F 16/27 |
| | | 707/694 |
| 2016/0125189 A1* | 5/2016 | Antonopoulos .... G06F 21/6227 |
| | | 726/30 |
| 2016/0210326 A1 | 7/2016 | Tolman et al. |
| 2017/0344749 A1 | 11/2017 | Yang et al. |
| 2017/0371954 A1 | 12/2017 | Kikuchi et al. |
| 2019/0361897 A1 | 11/2019 | Bernstein et al. |

\* cited by examiner

| Ordinal | Term |
|---------|--------|
| 0 | aaabbb |
| 1 | cccddd |
| 2 | eeefff |

FIG. 4

| Document Number | Term Ordinal |
|---|---|
| 0 | 2 |
| 1 | 0 |
| 2 | 1 |

SCALABLE FINE GRAINED ACCESS CONTROL WITHIN A SEARCH ENGINE

CROSS-REFERENCE TO RELATED APPLICATIONS

This application is a continuation of and claims priority to the earlier filing date of U.S. patent application Ser. No. 16/748,649, filed on Jan. 21, 2020, which is a continuation of and claims priority to the earlier filing date of U.S. patent application Ser. No. 15/419,748, filed on Jan. 30, 2017, the contents of which are hereby incorporated by reference herein in entirety.

TECHNICAL FIELD

The subject matter described herein relates to search engines for searching a large document set in a database or data repository, and more particularly to providing fine-grained access control within a search engine.

BACKGROUND

Access control by a search engine is typically performed using an access control list (ACL), which restricts access to documents based on a user role within an enterprise or their identity. Providing fine-grained access control within a search engine is a challenge for many organizations. The actual technical challenge is to filter a large document set based on large a number of access control predicates. A typical approach within a search engine is to build a Boolean query out of the search predicates and create a filter for the main query. The main problem with the Boolean query approach is it that it begins to slow down with a relatively low number of clauses (low tens of thousands). Also, just the act of parsing and building a Boolean query with tens or hundreds of thousands of clauses becomes memory-intensive and slow.

For the sake of discussion, consider the case where each access control predicate is a text token with an average size of 16 bytes. In this scenario a "bag" of 400,000 Tokens would be over 6 megabytes (MB) of text. Handling each token as an individual java string would expand this figure considerably. Java will treat each byte as a character, doubling the size to 12 MB of text. Java Strings also carry 32 bytes of overhead per string. Now the original 6 MB of text has expanded to 25 MB. Building Boolean queries from the 400,000 strings continues to pile on more and more object reference overhead. Creating, destroying and manipulating all of this object reference overhead becomes very costly for performance.

What is needed is a way to handle access control predicates, and for providing fine-grained access control within a search engine efficiently and effectively.

SUMMARY

This document describes a system and method to provide fine-grained access control within a search engine.

In one aspect, a method for providing fine-grained access control within a search engine is described. The method includes receiving, by a computer processor from the search engine, one or more access control predicates associated with a search query, the one or more access control predicates including fixed-width and/or variable-width tokens. The method further includes formatting, by the computer processor, the one or more access control predicates in a machine-readable binary format to generate a single byte array. The method further includes generating, by the computer processor, a pre-sorted memory index structure associated with the single byte array, the pre-sorted memory index structure being generated by sorting the one or more access control predicates according to their associated fixed-width and/or variable width tokens.

The method further includes merge joining, by the computer processor, the pre-sorted memory index structure with an uninverted terms index. The uninverted terms index includes a sorted list of all terms in a field associated with the search query, and includes a document index mapping each document identifier (ID) to a term ordinal for a specific field. The merge join identifies document ID matches against the one or more access control predicates. A computer program product and a system are also described, implementing the method described above.

Implementations of the current subject matter can include, but are not limited to, systems and methods, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document describes a system and method for providing scalable, fine-grained access control within a search engine. In exemplary implementations, the system and method are configured for handling the access control predicates as a single array of bytes, instead of as a text token of an individual Java String. Accordingly, the access control predicates can be pre-sorted so that the search engine does not have to change the bytes within the access control byte array. Offsets into the byte array for each predicate are calculated and maintained in a separate integer array. Once the access control predicates and offsets are stored in a pre-sorted memory index structure, the search engine can merge join it with another index structure, such as an uninverted terms index. Then, a two-step join can be executed by the search engine to collect term ordinals, and iterate the document index.

Binary Formatting of the Access Control List

As suggested above, a solution to the problem of access control by a search engine is to treat the access control predicates as a single array of bytes. If the tokens are fixed width, then the tokens can be stored within the byte array without padding and with zero memory overhead. Variable-width tokens can be stored with a single byte header describing the length of the token. To read the individual tokens, a single BytesRef object can be slid along the byte array to provide a pointer to tokens within the array.

Pre-Sorting of the Access Control Predicates

The tokens associated with the Access Control Predicates within the access control list also must be pre-sorted to allow for fast binary searching and merge joining. Sorting of the Access Control Predicates is done ahead of time so that the search engine does not have to change the bytes within the access control byte array. The pre-sorted Access Control Predicates can be formed as a large binary Access Control List (ACL), and sent to the search engine using HTTP multi-part request. To ensure the efficient handling of a large binary access control list (ACL), the ACL can be sent as a stream of bytes. In the case of an HTTP request an HTTP multi-part request can be used to stream the ACL portion of the request. The search engine can then read the binary ACL as a stream of bytes and avoid the overhead involved with String HTTP parameters.

Calculating Offsets

Variable-width Access Control Predicates are stored with a single byte header for the length of each predicate. In order to facilitate binary searching of the Access Control Predicates, the offsets into the byte array for each predicate are calculated and maintained in a separate integer array. This is a very fast operation that can be done at query time by skipping through the length headers in the byte array and by calculating the offset for each token.

Merge Join Rather than Boolean Query

Once the Access Control Predicates are provided in a pre-sorted memory index structure, it can be merge joined with another index structure. In some implementations, a search engine, like Lucene, has two types of index structures: inverted and uninverted. Both structures contain a sorted terms index that could be joined with the Access Control Predicates.

The evolution of the different index structures points towards the uninverted terms index. This is because the uninverted term indexes were designed for very fast repetitive operations, such as facet calculations for example. On the other hand, the inverted index was designed for fast access to a relatively small number of terms. This is one of the reasons that large Boolean queries, which access the inverted index, slow down as they grow to thousands of clauses.

Two Step Join

The uninverted index provides a fast structure with which to merge join, but it does not provide enough information to satisfy the filter criteria of access control for a search query in one step. A two-step join can be used to map the Access Control Predicates to a list of matching documents.

Collect Term Ordinals

In the first step of the join, the Access Control Predicates are intersected with the uninverted Terms Index. The Terms Index is a sorted list of all Terms in a field. During the join, the ordinal number of each intersecting Term is collected in a BitSet. This BitSet provides a very fast data structure for the second stage of the join.

Iterate the Document Index

An uninverted index also contains a Document Index, which is a mapping from a document identifier (ID) to a term ordinal for a specific field. Step two of the join is to iterate through each of the document ID's in the document index and retrieve the term ordinal. Then, each ordinal is tested against the ordinal BitSet collected in Step 1 of the two-step join. If the ordinal is in the BitSet then the document ID matches an Access Control Predicate.

Figure 1:
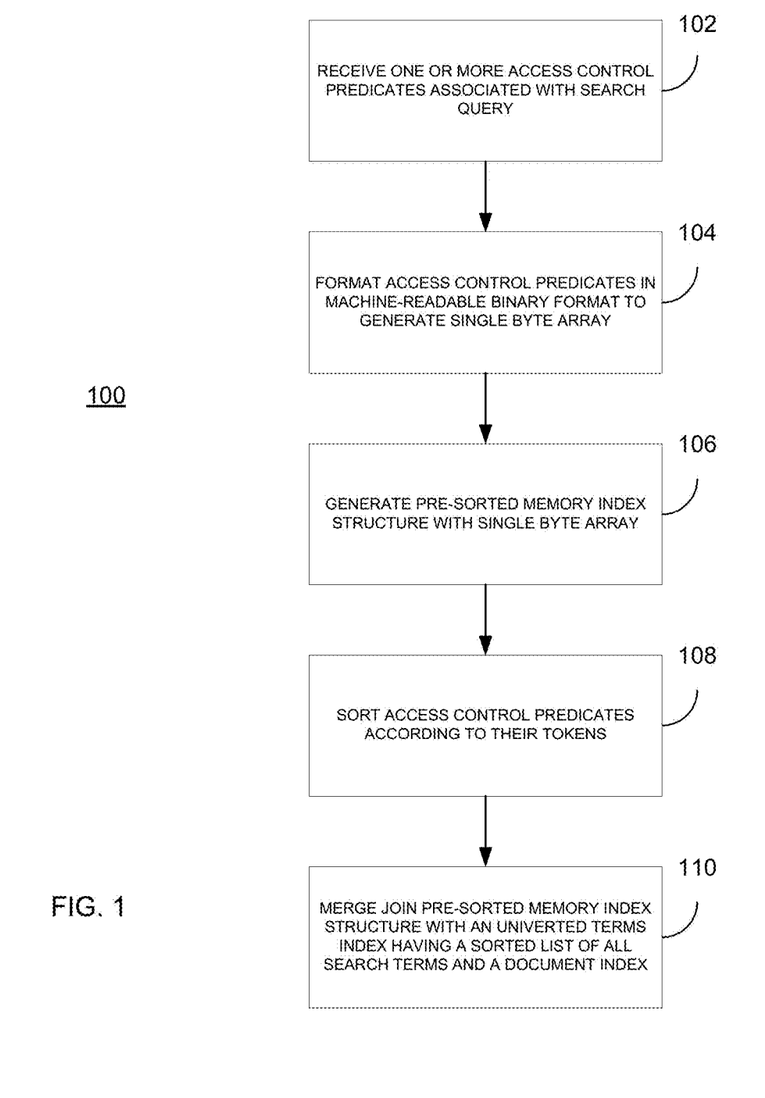
FIG. 1 is a flowchart of a method for providing fine-grained access control in a search engine.

FIG. 1 is a flowchart of a method 100 for providing fine-grained access control in a search engine. At 102, a computer processor receives one or more access control predicates associated with a search query from the search engine. The access control predicates include any number of fixed-width and/or variable-width access control list (ACL) tokens. A fixed-width ACL is an array of bytes, where the first byte indicates a length of each token (N), followed by ACL tokens each of fixed length N, as shown below:

6aaabbbcccdddeeefff . . .

The example given above has three ACL tokens, {aaabbb, cccddd, eeefff . . . }, each having a fixed length of 6 bytes.

By contrast, a variable-width ACLE is an array of bytes, where each token has a one byte header describing the token length, followed by the token, as shown below:

6aaabbb9cccccdddd6eeefff . . .

The example given above has three ACL tokens, {aaabbb, cccccdddd, eeefff . . . }, of byte lengths of 6, 9 and 6, respectively.

At 104, the one or more access control predicates are formatted in a machine-readable binary format to generate a single byte array. At 105, the pre-sorted access control list is sent as a multi-part HTTP request, as a stream of bytes to stream the ACL portion of the request. Accordingly, the search engine can read the binary ACL as a stream of bytes and avoid overhead associated with string HTTP parameters.

At 106, a pre-sorted memory index structure associated with the single byte array is generated. The pre-sorted memory index structure is generated by sorting, at 108, the one or more access control predicates according to their associated fixed-width and/or variable width tokens.

Figure 2:
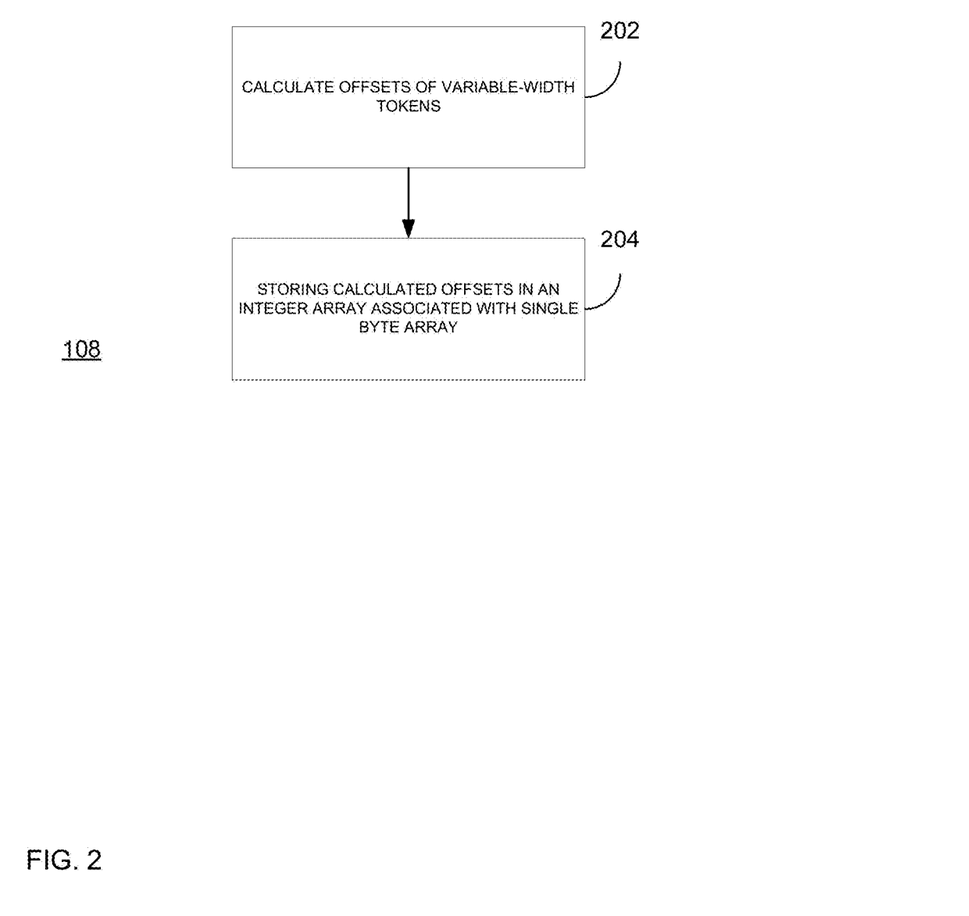
FIG. 2 is a flowchart of a general step to sort access control predicates according to their tokens.

The sorting step (108) is further described in FIG. 2. At 202, offsets of any variable-width tokens of the machine-readable binary-formatted access control are calculated, and at 204, the calculated offsets are stored in a memory by the computer processor in an integer array associated with the single byte array.

Figure 4:
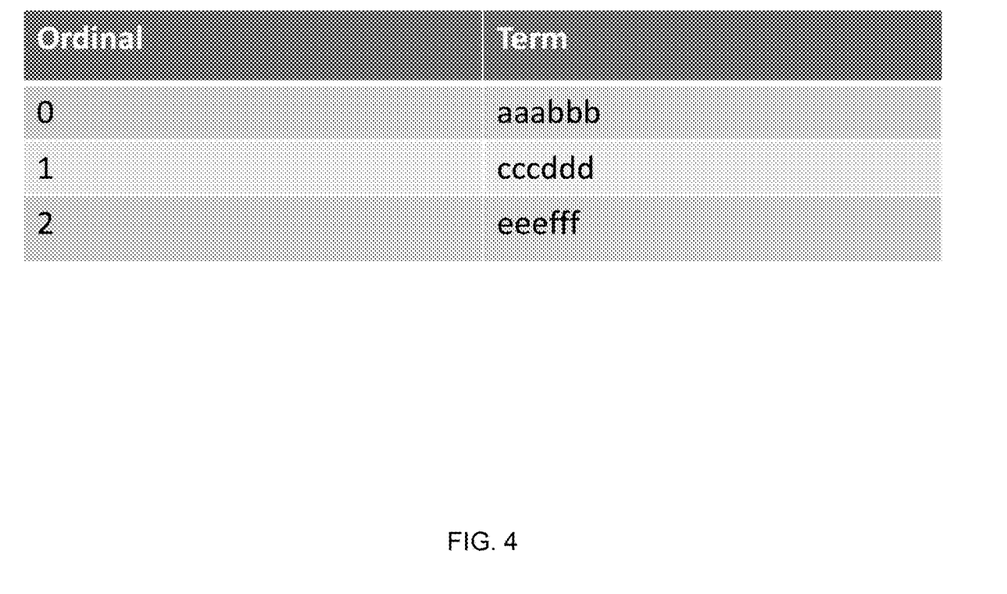
FIG. 4 shows an example of an uninverted terms index.
Figure 5:
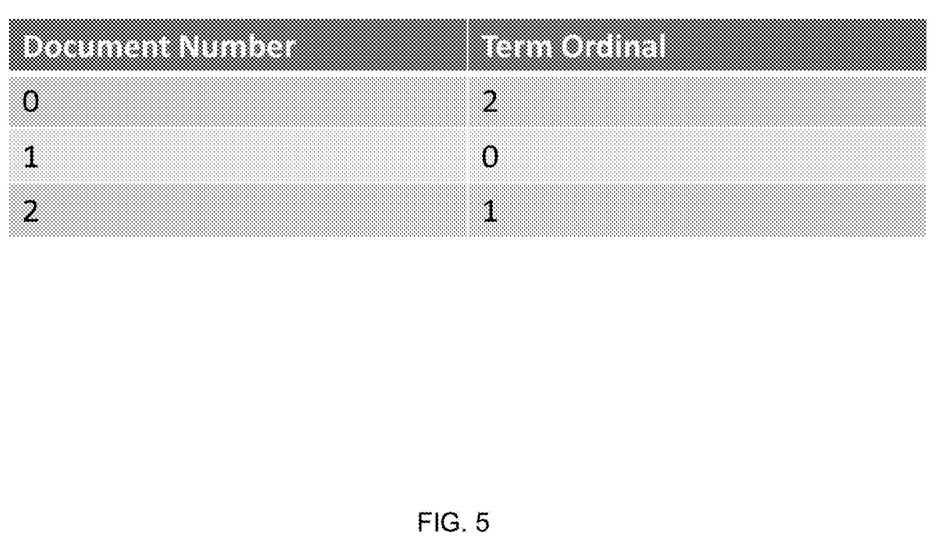
FIG. 5 shows an example of a document index.

Returning to FIG. 1, at 110, the computer processor merge joins the pre-sorted memory index structure with an uninverted terms index, in a two-step join. The uninverted terms index includes a sorted list of all terms in a field associated with the search query, as shown in the example in FIG. 4. The uninverted terms index further includes a document index mapping each document identifier (ID) to a term ordinal for a specific field, as shown in the example in FIG. 5. The merge joining identifies document ID matches against the one or more access control predicates.

Figure 3:
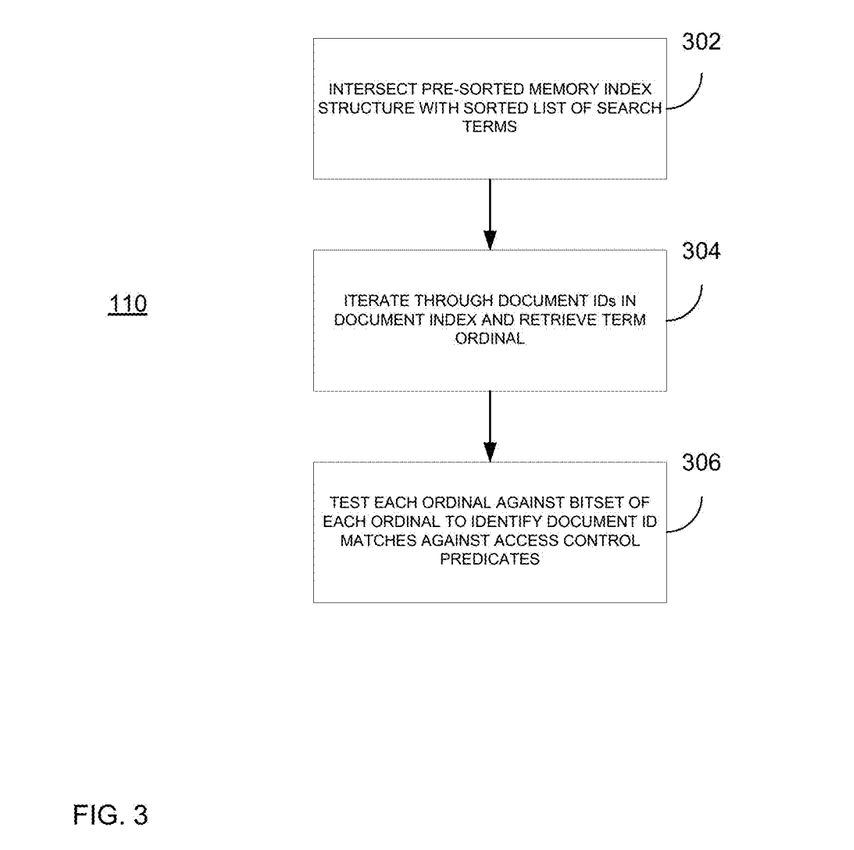
FIG. 3 is a flowchart of a general step to merge join a pre-sorted memory index structure with an uninverted terms index having a sorted list of all search terms and a document index.
Figure 7:
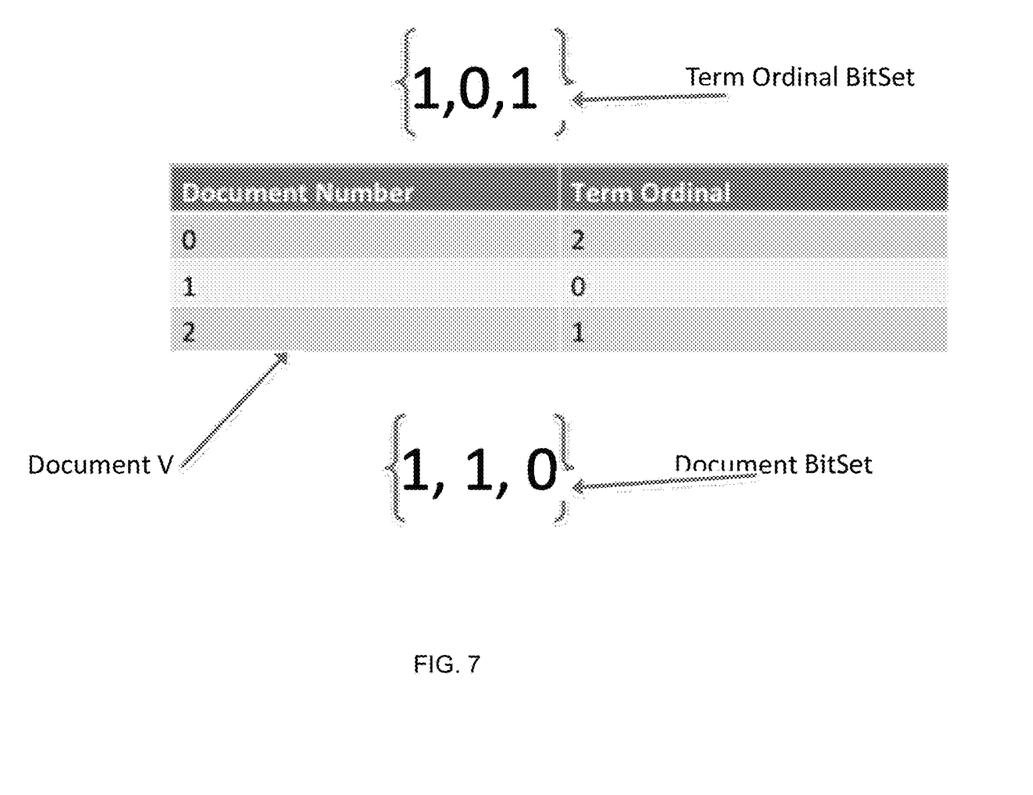
FIG. 7 shows an example of a second step of the merge join, in which the document values index is iterated, and each term ordinal is tested against the term ordinal BitSet.

The two-step join process is shown in the flowchart of FIG. 3. At 302, the pre-sorted memory index structure is intersected with the sorted list of all terms in the field associated with the search query to collect a bitset of each ordinal number of each intersecting term. At 304, the computer processor iterates through each of the document ID's in the document index and retrieves the term ordinal of each term. At 306, each term ordinal is tested against the bitset of each retrieved and collected ordinal to identify the document ID matches against the one or more access control predicates. FIG. 7 shows an example of a second step of the merge join, in which the document values index is iterated, and each term ordinal is tested against the term ordinal BitSet.

Figure 6:
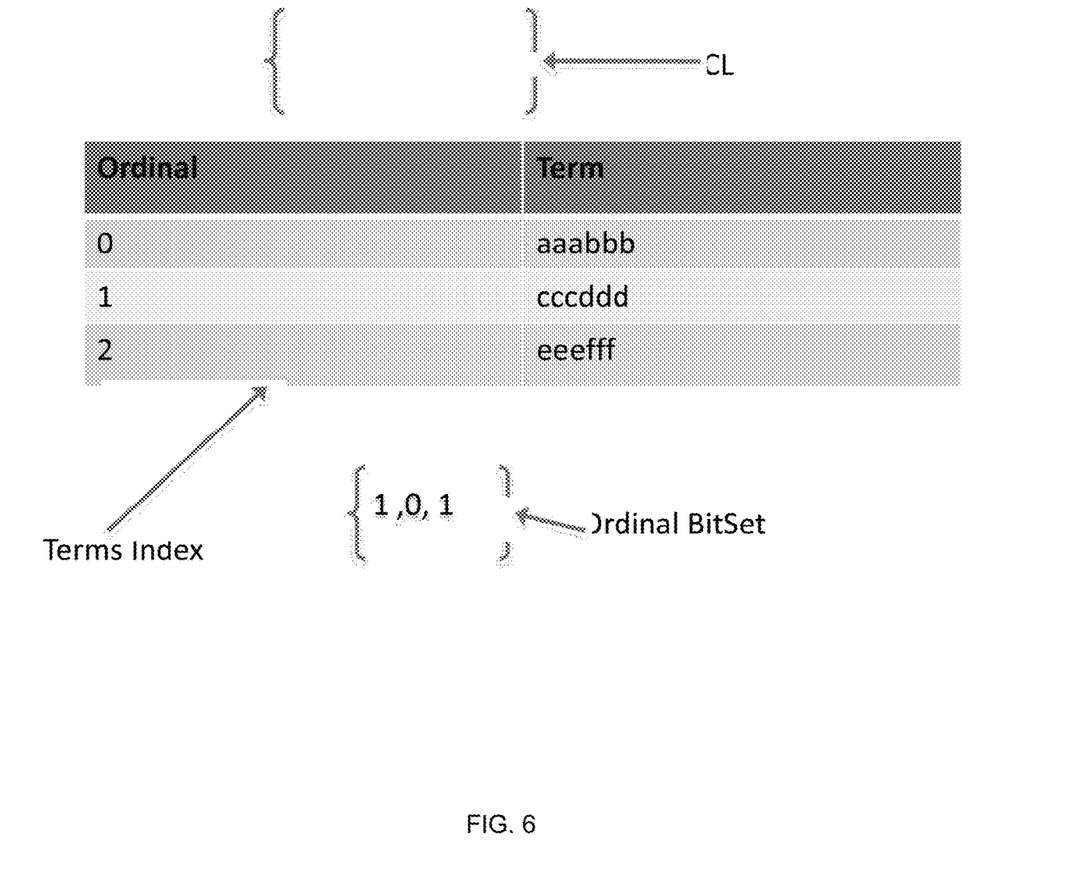
FIG. 6 shows an example of a first step of a merge join of fixed-width access control lists with a terms index, to collect the ordinal of intersecting terms in a BitSet.

In other words, Step 1 of the join includes: merge join the binary ACL with the terms index, then collect the term ordinal for each term that is in the ACL. Term ordinals are collected in a BitSet, for use in Step 2 of the join. FIG. 6 shows an example of a first step of a merge join of fixed-width access control lists with a terms index, to collect the ordinal of intersecting terms in a BitSet because pre-sorted lists are being used, the ACL can be intersected with the terms index quickly. Step 2 of the join includes: iterate the Document Values Index, and then for each document retrieve the term ordinal. Next, test the term ordinal against the BitSet collected in join Step 1; if the term ordinal is in the Bitset, collect the document number in a different BitSet. The document number BitSet is the filter used to filter the main query.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An access control method comprising:
   receiving, via one or more processors, from a search engine at least one access control predicate;
   generating, via the one or more processors, an array responsive to formatting the at least one access control predicate;
   generating, via the one or more processors, a memory index structure associated with the array, the memory index structure being pre-sorted based on a sort order of a plurality of access control predicates received from the search engine;
   merging, via the one or more processors, the memory index structure that has been presorted with an uninverted terms index that includes:
      a sorted list of a plurality of search terms; and
      a document index mapping a document identifier (ID) to a term ordinal for a predetermined value associated with one or more search terms; and
   identifying, via the one or more processors, one or more matches for the document ID against one or more access control predicates by testing the term ordinal against a bitset of ordinal terms to determine whether the document ID matches against the one or more access control predicates.

2. The method of claim 1, wherein the array is a single byte array.

3. The method of claim 1, wherein the access control predicate is associated with a search query.

4. The method of claim 1, wherein the at least one access control predicate is formatted in a machine-readable binary format.

5. The method of claim 1, wherein the one or more access control predicates include fixed-width or variable-width tokens.

6. The method of claim 5, wherein the plurality of access control predicates are sorted according to a respective fixed-width token or variable-width tokens.

7. The method of claim 6, wherein sorting of the plurality of access control predicates comprises:
   calculating offsets of the variable-width tokens of machine-readable binary-formatted access control; and
   storing the offsets in an integer array associated with the array.

8. The method of claim 1, wherein the merging comprises intersecting a pre-sorted memory index structure with a sorted list of terms in a field associated with a search query to collect a bitset of an ordinal number of an intersecting term.

9. The method of claim 8, wherein the merging comprises iterating through document IDs in a document index and retrieving the term ordinal.

10. The method of claim 8, wherein the merging comprises testing the ordinal terms against the bitset of a collected ordinal to determine whether the document ID matches against one or more access control predicates.

11. A non-transitory computer program product storing instructions that, when executed by at least one programmable processor, cause the at least one programmable processor to perform operations comprising:
   receive, from a search engine, one or more access control predicates associated with a search query, the one or more access control predicates including fixed-width and/or variable-width tokens;
   format the one or more access control predicates in a machine-readable binary format to generate a single byte array;
   sort the one or more access control predicates according to their associated fixed-width and/or variable width tokens;
   generate a pre-sorted memory index structure associated with the single byte array based on the sorting; and
   merge join the pre-sorted memory index structure with an uninverted terms index, the uninverted terms index having a sorted list of all terms in a field associated with the search query, and having a document index mapping a document identifier (ID) to a term ordinal for a specific field, the merge joining identifying document ID matches against the one or more access control predicates.

12. The non-transitory computer program product in accordance with claim 11, wherein the operations to sort the one or more access control predicates according to their associated fixed-width and/or variable width tokens further comprise operations to calculate offsets of any variable-width tokens of machine-readable binary-formatted access control.

13. The non-transitory computer program product in accordance with claim 12, wherein the operations to sort the one or more access control predicates according to their associated fixed-width and/or variable width tokens further comprise operations to store in a memory the offsets in an integer array associated with the single byte array.

14. The non-transitory computer program product in accordance with claim 13, wherein the operations to merge join the pre-sorted memory index structure with an uninverted terms index include operations to intersect the pre-sorted memory index structure with the sorted list of all terms in the field associated with the search query to collect a bitset of an ordinal number of an intersecting term.

15. The non-transitory computer program product in accordance with claim 14, wherein the operations to merge join the pre-sorted memory index structure with an uninverted terms index further include operations to iterate through document IDs in the document index and retrieving the term ordinal.

16. The non-transitory computer program product in accordance with claim 15, wherein the operations to merge join the pre-sorted memory index structure with an uninverted terms index further include operations to test an ordinal against the bitset of a collected ordinal to identify the document ID matches against the one or more access control predicates.

17. A system for providing fine-grained access control in a search engine, the system comprising:
   at least one programmable processor; and
   a machine-readable medium storing instructions that, when executed by the at least one programmable processor, cause the at least one programmable processor to perform operations comprising:
      receive, from the search engine, one or more access control predicates associated with a search query, the one or more access control predicates including fixed-width and/or variable-width tokens;
      format the one or more access control predicates in a machine-readable binary format to generate a single byte array;
      sort the one or more access control predicates according to their associated fixed-width and/or variable width tokens;

generate a pre-sorted memory index structure associated with the single byte array based on the sorting; and merge join the pre-sorted memory index structure with an uninverted terms index, the uninverted terms index having a sorted list of all terms in a field associated with the search query, and having a document index mapping a document identifier (ID) to a term ordinal for a specific field, the merge joining identifying document ID matches against the one or more access control predicates.

18. The system in accordance with claim 17, wherein the operations to sort the one or more access control predicates according to their associated fixed-width and/or variable width tokens further comprise operations to calculate offsets of any variable-width tokens of the machine-readable binary-formatted access control.

19. The system in accordance with claim 18, wherein the operations to sort the one or more access control predicates according to their associated fixed-width and/or variable width tokens further comprise operations to store in a memory the offsets in an integer array associated with the single byte array.

20. The system in accordance with claim 17, wherein the operations to merge join the pre-sorted memory index structure with an uninverted terms index include operations to intersect the pre-sorted memory index structure with the sorted list of all terms in the field associated with the search query to collect a bitset of an ordinal number of an intersecting term, wherein the operations to merge join the pre-sorted memory index structure with an uninverted terms index further include operations to iterate through document IDs in the document index and retrieving the term ordinal, and wherein the operations to merge join the pre-sorted memory index structure with an uninverted terms index further include operations to test the term ordinal against the bitset of the ordinal number to identify the document ID matches against the one or more access control predicates.

* * * * *